United States Patent
Licht et al.

(10) Patent No.: US 12,416,390 B2
(45) Date of Patent: Sep. 16, 2025

(54) LIGHTING DEVICE FOR ILLUMINATING OR BACKLIGHTING A LIGHT SIGNATURE AND LIGHTING UNIT WITH AN ILLUMINATABLE OR BACKLIGHTABLE LIGHT SIGNATURE AND SUCH A LIGHTING DEVICE

(71) Applicant: Marelli Germany GmbH, Reutlingen (DE)

(72) Inventors: Martin Licht, Reutlingen (DE); Sylvain Teysseyre, Reutlingen (DE)

(73) Assignee: Marelli Germany GmbH, Reutlingen (DE)

( * ) Notice: Subject to any disclaimer, the term of this patent is extended or adjusted under 35 U.S.C. 154(b) by 0 days.

(21) Appl. No.: 18/613,314

(22) Filed: Mar. 22, 2024

(65) Prior Publication Data

US 2024/0318803 A1 Sep. 26, 2024

(30) Foreign Application Priority Data

Mar. 24, 2023 (DE) .......................... 102023107551.9

(51) Int. Cl.
*F21V 8/00* (2006.01)
*F21S 43/239* (2018.01)

(52) U.S. Cl.
CPC .......... *F21S 43/239* (2018.01); *G02B 6/0051* (2013.01); *G02B 6/0055* (2013.01); *G02B 6/009* (2013.01)

(58) Field of Classification Search
CPC ........ F21S 43/239; F21S 43/14; G02B 6/009; G02B 6/0051; G02B 6/0055;

(Continued)

(56) References Cited

U.S. PATENT DOCUMENTS 7,712,933 B2 5/2010 Fleischmann et al.
10,086,700 B2 * 10/2018 Salter ....................... B60Q 3/76
(Continued)

FOREIGN PATENT DOCUMENTS

| CN | 107062115 B | * | 5/2021 | .......... B60Q 1/0052 |
| DE | 4341825 A1 | | 6/1994 | |

(Continued)

OTHER PUBLICATIONS

Search English translation of CN-107062115-B (Year: 2021).*
Search Report for German Patent Application No. 102023107551.9 dated Jan. 15, 2024.

*Primary Examiner* — Omar Rojas Cadima
(74) *Attorney, Agent, or Firm* — Howard & Howard Attorneys PLLC

(57) ABSTRACT

A lighting device for illuminating or backlighting a light signature, comprising: at least one semiconductor light source for emitting light in a main radiation direction corresponding to an optical axis of the semiconductor light source, at least one partially transparent reflective layer arranged in front of and at a distance from at least one associated semiconductor light source in the main emission direction, and a translucent volume scattering material which is arranged at the distance between the at least one semiconductor light source and the at least one associated partially transparent reflective layer, or which is arranged in front of the partially transparent reflective layer in the main radiation direction.

23 Claims, 9 Drawing Sheets

(58) Field of Classification Search
CPC .. G09F 21/049; G09F 21/048; G09F 13/0481; G09F 13/0404; B60Q 1/28; B60Q 3/14; B60Q 3/16; B60Q 3/20; B60Q 3/54; B60Q 3/76; B60Q 3/80; B60R 13/005; B60R 13/00; B60R 13/02; B60R 13/0256; B60R 13/10
See application file for complete search history.

(56) References Cited

U.S. PATENT DOCUMENTS

| | | | | |
|---|---|---|---|---|
| 2004/0170017 | A1* | 9/2004 | Zhan | F41G 1/35 362/240 |
| 2007/0240346 | A1* | 10/2007 | Li | G09F 13/22 40/544 |

FOREIGN PATENT DOCUMENTS

| | | |
|---|---|---|
| DE | 202017007374 U1 | 1/2021 |
| FR | 3074566 A1 | 6/2019 |

* cited by examiner

LIGHTING DEVICE FOR ILLUMINATING OR BACKLIGHTING A LIGHT SIGNATURE AND LIGHTING UNIT WITH AN ILLUMINATABLE OR BACKLIGHTABLE LIGHT SIGNATURE AND SUCH A LIGHTING DEVICE

CROSS-REFERENCE TO RELATED APPLICATIONS

The present application claims priority to and all the benefits of German Patent Application No. 102023107551.9, filed on Mar. 24, 2023, the entire contents of which are hereby expressly incorporated herein by reference.

BACKGROUND OF THE INVENTION

1. Field of the Invention

The present invention relates to a lighting device for illuminating or backlighting a light signature, preferably in the field of a motor vehicle. Accordingly, the light signature can comprise, for example, a logo, an emblem or a name of a motor vehicle manufacturer or a vehicle model. However, the lighting device can of course also be used to illuminate or backlight other types of light signatures.

The invention also relates to a lighting unit comprising at least one light signature which can be illuminated or backlit and a lighting device for emitting light for illuminating or backlighting the at least one light signature which can be illuminated or backlit.

2. Description of the Related Art

U.S. Pat. No. 7,712,933 B2 discloses a lighting device for illuminating or backlighting a light signature and an illuminated or backlit light signature. In particular, various types of illuminated or backlit light signatures are described there. In a first type, the light signature consists of an opaque material and is embedded in a likewise opaque plate or film, with a gap remaining between the light signature and the plate or film, which can be illuminated by the lighting device. In a second type, the light signature is formed by one or more recesses in an opaque plate or film, which can be illuminated by the lighting device. A translucent material, which preferably also has the shape of the light signature, can be arranged in or on the recesses. The translucent material prevents foreign bodies from entering the recesses and/or can scatter the light passing through and/or can have a partially transparent chrome coating so that the light signature has a chrome effect when the lighting device is switched off. In a third type, the light signature is formed by a translucent material that has the shape of the light signature and is embedded in a transparent plate or film. The translucent material can scatter the light passing through it and/or have a partially transparent chrome coating, so that the light signature has a chrome effect when the lighting device is switched off.

The lighting device known from U.S. Pat. No. 7,712,933 B2 has laterally emitting LEDs that are arranged laterally offset to the light signature when viewed vertically to the illuminated or backlit light signature. An oblique light emission direction of the LEDs, at around 30° to the surface extension of the light signature, is intended to prevent so-called hotspots, i.e., locally limited areas with particularly high brightness compared to neighboring areas.

For the illumination of individual small light signatures in the front area of a motor vehicle, e.g., as part of a front panel or radiator grille, a low component thickness of the light unit in the direction of the optical axis or in the direction of travel of the vehicle is desirable, particularly with regard to pedestrian protection. At the same time, however, homogeneous illumination of several light signatures arranged in a matrix-like manner next to and/or on top of and/or offset to one another in one plane should be ensured. An example of such light signatures are, for example, the three-pointed stars arranged like a matrix in the front panel of Mercedes-Benz Group concept and/or electric vehicles. Homogeneous illumination relates both to the illumination of a single light signature with as uniform a brightness as possible and to the illumination of several light signatures with as uniform a brightness as possible.

For an attractive appearance in daylight when the lighting device is switched off, the light signatures to be illuminated or backlit are chrome-plated or mirrored, giving the light signatures a metallic appearance. To enable the light signatures to be illuminated or backlit, the mirror coating must be partially transparent. However, the transmission is relatively low if an appealing chrome appearance is still to be achieved (usually 1%-20% transmission), i.e., only 1%-20% of the light emitted by the lighting device still emerges from the illuminated or backlit light signature. In this case, a particularly efficient lighting device is required to achieve the necessary brightness, which still provides sufficient brightness of the light signature despite the low transmission.

Particularly with a very flat structure and low component thickness of the lighting device, inhomogeneities or even hotspots occur in the illuminated or backlit light signatures in the area of the semiconductor light sources, as the light beams emitted by these no longer have a sufficient light path for homogenization due to the flat structure. This effect occurs, for example, with a particularly thin construction depth of the lighting device of approx. 8 mm or less, in particular of approx. 5 mm, and at the same time from a diameter of the area of the individual light signatures to be illuminated of approx. 15 mm or more, in particular from diameters of 30 mm. In general terms, it can be said that an approximate ratio of construction depth to diameter of the illuminated area of 1:3 is advantageous for homogeneous illumination. With a construction depth of 7 mm, a diameter of approx. 21 mm can therefore be homogeneously illuminated.

SUMMARY OF THE INVENTION

The present invention is based on the object of designing and further developing a lighting device of the type mentioned above in such a way that, on the one hand, it has a particularly small thickness in the direction of light emission and, on the other hand, still enables the most homogeneous possible illumination or backlighting of at least one light signature.

To solve this problem, the present invention is directed toward a lighting device including at least one semiconductor light source for emitting light in a main emission direction which corresponds to an optical axis of the semiconductor light source, at least one partially transparent reflective layer arranged in front of and at a distance from at least one associated semiconductor light source in the main direction of emission, and a translucent volume scattering material arranged at the distance between the at least one semiconductor light source and the at least one associated partially transparent reflective layer.

The light emission direction of the lighting device runs essentially parallel to the optical axis of the semiconductor light source. In the case of a plate-shaped flat design of the volume scattering material with several semiconductor light sources, the optical axes of the light sources run perpendicular to a surface extension of the volume scattering material and parallel to each other. In a curved configuration of the volume scattering material with several semiconductor light sources, the optical axes of the light sources run perpendicular to a surface extension of the volume scattering material and diverging (i.e., the light beams run through a point or area behind the lighting device) or converging (i.e., the light beams run through a point or area in front of the lighting device) to each other. In the prior art, local areas of high light intensity of the light emerging from the lighting device (so-called hotspots) occur in particular around the optical axis of the semiconductor light source, i.e., in the main radiation direction of the semiconductor light source.

In the present invention, on the other hand, light emitted by the at least one semiconductor light source in the main direction of emission passes through the volume scattering material and is scattered by it. This is a first measure to reduce hotspots in particularly thin lighting devices.

However, instead of being emitted immediately through a front side of the volume diffusion material or the lighting device in the direction of the light signature to be illuminated or backlit, a first part of the emitted light is reflected back around the optical axis or the main direction of emission through the partially transparent reflective layer, i.e., in the direction of a rear side of the volume diffusion material or the lighting device. Only a second part of the emitted light around the optical axis or the main direction of emission, which has not been reflected, is transmitted through the partially transparent reflective layer and leaves the lighting device through the front of the volume diffusion material or the lighting device in the direction of the light signature to be illuminated or backlit. This is therefore a second measure to reduce hotspots in particularly thin lighting devices.

The invention enables a particularly thin structure of the lighting device, which is particularly simple in design and can be manufactured at low cost. Furthermore, the lighting device enjoys the advantages of high efficiency and good homogenization of the emitted light.

The semiconductor light source preferably comprises at least one LED, which may take the form of at least one top-emitting LED, i.e., an LED that emits light to the front (i.e., essentially perpendicular to the mounting surface) rather than laterally (i.e., parallel or at an angle to the mounting surface) in relation to its mounting surface. The LED can emit light in a 180° half-space around the main direction of emission. The light intensity of the light emitted around the main direction of emission can be greater than the intensity of the light emitted at larger angles of up to 90° with respect to the main direction of emission. The emission angle can be reduced to a half-space of less than 180° using an optical attachment (e.g., a lens), which can be an integral part of the LED. Of course, the semiconductor light source can also be designed as another type of light source, e.g., a laser diode, an OLED or similar.

The volume scattering material consists, for example, of a thermoplastic, such as a polycarbonate, including a suitable type of Makrolon®. The volume scattering material can be colorless (crystal clear) or colored (in the case of a crystal-clear volume scattering material, however, it is no longer referred to as a volume scatterer). The term translucent in connection with the volumetric scattering material includes both transparent and translucent.

It is conceivable that the volume scattering material is inserted as a separate translucent plate in the gap or interspace between the semiconductor light source and the partially transparent reflective layer. An air gap can remain between the volume scattering material and the semiconductor light source and/or between the volume scattering material and the semi-transparent reflective layer. In one embodiment, however, there is no air gap between the volume scattering material and the semiconductor light source and/or between the volume scattering material and the partially transparent reflective layer.

In this sense, according to an advantageous further development of the present invention, it is proposed that the light-transmitting volume scattering material is introduced into the gap between the at least one semiconductor light source and the at least one associated partially transparent reflective layer and completely fills this gap. For example, the heated volume scattering material or its starting product can be injected into the gap, where it then hardens. The hardened material forms the volumetric scattering material.

It would also be conceivable to first overmold or inject the at least one semiconductor light source with the heated volume scattering material or its starting product, with the main radiation direction of the semiconductor light source running parallel to the optical axis of the semiconductor light source and parallel to a light emission direction of the lighting device for this semiconductor light source. In the case of several semiconductor light sources distributed along a curved volume scattering material, the lighting device can have several diverging or converging light emission directions. In this case, a separate light emission direction of the lighting device is preferably provided for each of the semiconductor light sources.

According to one embodiment of the invention, it is proposed that the at least one semiconductor light source is mounted and electrically contacted on a printed circuit board, such as on a flexible printed circuit board. The flexible printed circuit board can be designed as a foil. The semiconductor light source can be glued or otherwise attached to a foil printed with conductor tracks. The semiconductor light source and the surrounding foil can then be overmolded with the volume scattering material.

Advantageously, it is proposed that the at least one partially transparent reflective layer is applied to a transparent plate, such as a flexible plate or film. To realize the partially transparent reflective layer, the transparent sheet or film can be printed with a partially transparent lacquer. The lacquer applied over the entire surface could be designed in such a way that it reflects part of the incident light and transmits another part. The transmission and reflection properties may be independent of the frequency of the light. However, it would also be conceivable to create a partially transparent reflective layer by using a reflective coating that does not allow any light to pass through when applied to the entire surface. Such a coating could be applied to the transparent plate or film in the form of pixels, with a first part of the incident light being reflected in the area of the pixels and a second part of the light being transmitted in the area between adjacent pixels. Of course, any at least partially light-reflecting paint, mirror coating or other reflective coating can be used to form the partially transparent reflective layer.

In one embodiment, the translucent volume scattering material is introduced into the space between the printed circuit board with the at least one semiconductor light source and the transparent plate or film with the at least one associated partially transparent reflective layer and completely fills this space. Alternatively, it would also be conceivable to apply the transparent plate or film with the at least one associated partially transparent reflective layer to the volume scattering material only after the semiconductor light source has been overmolded or injected with the volume scattering material or its starting material.

The partially transparent reflective layer can be arranged or formed on the outside (i.e., on the side facing the front of the lighting device) of the transparent plate or film. However, the partially transparent reflective layer may be arranged on the inside (i.e., on the side facing the rear of the lighting device) of the transparent sheet or film. In the latter case, the partially transparent reflective layer is preferably surrounded by the volume scattering material. This protects the reflective layer from mechanical stress (e.g., knocks, impacts, scratches), environmental influences (e.g., high or low temperatures, moisture) and/or chemical influences (e.g., acid, fuel).

It is further proposed that the at least one partially transparent reflective layer is designed to scatter the transmitted and/or reflected light. The scattering of the transmitted light can be regarded as a further measure for homogenizing the light emerging from the lighting device or for avoiding hotspots in the case of particularly thin lighting devices.

Scattering the reflected light can also contribute to the homogenization of the emitted light if the reflected light is part of the emitted light. This can be achieved, for example, by arranging a second reflective layer around the at least one semiconductor light source, which reflects the reflected scattered light back towards the front of the lighting device. There it can either be transmitted through the partially transparent reflective layer or emerge from the side of the lighting device next to the partially transparent reflective layer, for example through the transparent plate or film to which the partially transparent reflective layer is applied.

It is also conceivable that the at least one partially transparent reflective layer has locally different reflection and transmission properties. This can be achieved, for example, by applying a coating, mirror coating or other materials with different reflection/transmission properties. Alternatively or additionally, a partially transparent reflective layer with locally different reflection and transmission properties can also be realized by a pixel-like application of a coating, mirror coating or other material in conjunction with a different pixel density per unit area and/or different sizes of the pixels. Of course, the different transmission or reflection properties can be distributed as desired over different areas of the partially transparent reflective layer. This has the advantage that individual hotspots or intensity maxima in the illuminated or backlit light signatures can be specifically reduced or even eliminated.

It is particularly preferable if the transmission of the semi-transparent reflective layer increases outwards from a minimum value in the area of the optical axis or around the main direction of radiation of a semiconductor light source assigned to the semi-transparent reflective layer. This means that the central light rays emitted by the semiconductor light source around the optical axis are reflected most strongly and the greater the distance of the emitted light rays from the optical axis, the greater the proportion of transmitted light. This takes account of the fact that, in the prior art, hotspots occur in particular around the optical axis of the semiconductor light source, i.e., in the main direction of radiation of the semiconductor light source. These hotspots can be specifically reduced or even prevented with this further development.

The efficiency of the lighting device and/or homogenization of the emitted light can also be improved by the fact that the at least one semiconductor light source is mounted and electrically contacted on a printed circuit board, preferably a flexible printed circuit board, and the printed circuit board is curved in the region of the at least one semiconductor light source in a direction away from the at least one associated partially transparent reflective layer.

As a result, the at least one semiconductor light source is arranged at the bottom of a funnel that is curved towards the rear of the lighting device. This is particularly advantageous if a second reflective layer is arranged around the at least one semiconductor light source, which reflects the reflected scattered light back towards the front of the lighting device. Viewed in cross-section, the walls of the funnel can be flat, curved inwards (i.e., towards the optical axis) or outwards (i.e., away from the optical axis).

The efficiency of the lighting device and/or homogenization of the emitted light can additionally also be improved by the fact that the at least one partially transparent reflective layer in the region of the optical axis of the at least one associated semiconductor light source is curved in a direction towards the at least one semiconductor light source. This is particularly advantageous if a second reflective layer is arranged around the at least one semiconductor light source, which reflects the reflected scattered light back towards the front of the lighting device. In this way, it can be achieved that the part of the light emitted by the semiconductor light source that is reflected by the partially transparent reflective layer strikes the second reflective layer at an angle to the side and is deflected from there back to the front of the lighting device in an area that is next to the partially transparent reflective layer, so that the light leaves the lighting device and illuminates or backlights the light signature. In other words, light that was originally part of the hotspot is redirected to an area outside the original hotspot. The areas of the light signature that lie outside the original hotspot therefore appear brighter.

According to a further embodiment of the invention, it is proposed that a clear transparent polycarbonate is arranged at the distance between the at least one semiconductor light source and the at least one associated partially transparent reflective layer. In this case, a transparent plate or film on which the partially transparent reflective layer is arranged is provided with light-scattering properties. Alternatively or additionally, it would be conceivable to apply a scattering coating, for example over the entire surface, to an outer side (corresponds to the front side) of the sheet or film. It is also possible to achieve scattering via a rough surface on the outside of the sheet or film. Alternatively, the translucent volume scattering material can also be arranged in front of the partially transparent reflective layer in the main direction of radiation. At the expense of a smaller thickness of the lighting device, this design can achieve improved homogeneity of the emitted light. The greater the distance between the partially transparent reflective layer and a light-emitting surface of a scattering layer following in the light-emitting direction, the more homogeneous the light distribution.

To solve the object underlying the present invention, a lighting unit that has a lighting device according to the invention for illuminating or backlighting the light signature is also disclosed.

According to an advantageous further development of the invention, it is proposed that the at least one light signature that can be illuminated or backlit is a logo, an emblem or a name of a motor vehicle manufacturer or a vehicle model.

According to an advantageous embodiment of the invention, it is proposed that the at least one light signature that can be illuminated or backlit is part of a front panel or a front grille of a motor vehicle. However, it would of course also be conceivable for the at least one light signature to be part of a rear panel of a motor vehicle. It would also be conceivable for the light unit to be mounted on a motor vehicle body or embedded in a recess in the motor vehicle body, for example on the sides of the motor vehicle, in particular in the area of a B-pillar (e.g., in a coupe or convertible), a C-pillar (e.g., in a saloon), a D-pillar (e.g., in a station wagon or a van) of the motor vehicle or at the rear of the motor vehicle.

BRIEF DESCRIPTION OF THE DRAWINGS

Further features and advantages of the invention are explained in more detail below with reference to the figures. It should be noted that individual features shown in the figures and described below may also be essential to the invention when considered on their own, even if this cannot be expressly inferred from the figures or the description. Furthermore, it is pointed out that any combination of the features shown in the figures and described in the description may also be essential to the invention, even if this combination cannot be expressly inferred from the figures or the description. Thus, other advantages of the invention will be readily appreciated as the same becomes better understood by reference to the following detailed description when considered in connection with the accompanying drawings, wherein:

FIG. 2 shows the lighting device from FIG. 1 with exemplary light beams drawn in;

FIG. 13 shows the lighting device of FIG. 12 with exemplary light beams drawn in;

DETAILED DESCRIPTION OF THE INVENTION

Figure 1:
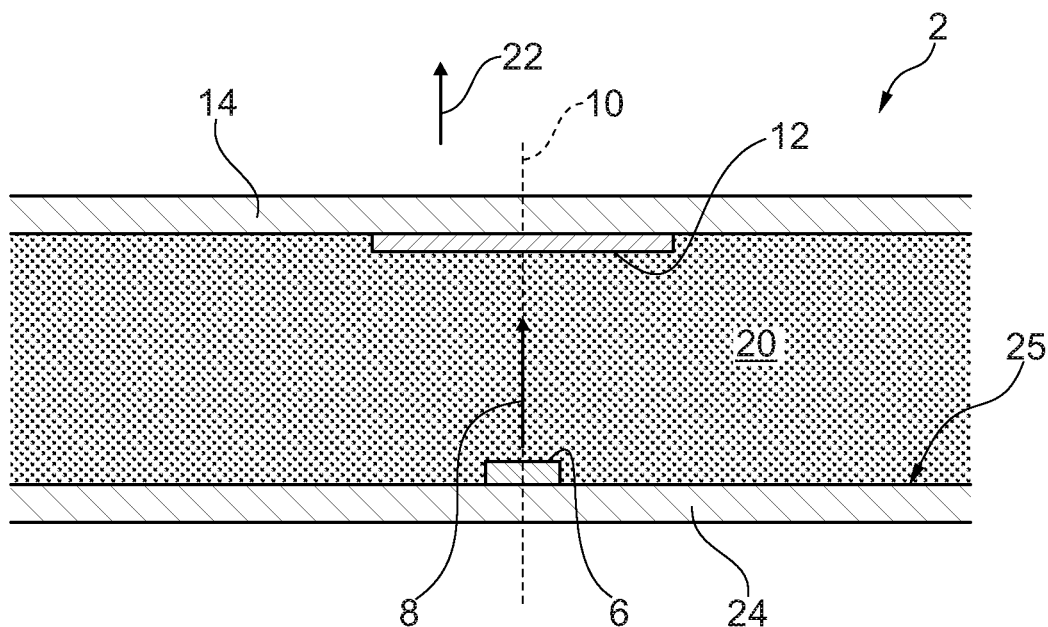
FIG. 1 shows a lighting device according to the invention according to a first preferred embodiment.

The present invention relates to a lighting device of the thinnest possible construction for the most homogeneous possible illumination or backlighting of one or more light signatures, which is or are, for example, part of a front panel, a radiator grille or a rear panel of a motor vehicle.

For the illumination of individual small light signatures, a low component thickness of the lighting device or the entire lighting unit in the direction of the optical axis is desirable, particularly for reasons of pedestrian protection.

However, a low component thickness is in conflict with a homogeneous distribution of the light emitted by the lighting device. Especially with a flat design of the lighting device, inhomogeneities up to hotspots can occur in the area of semiconductor light sources of the lighting device, as the light beams can no longer cover a sufficient light path for homogenization. This effect is particularly noticeable when the area of the light signatures to be illuminated has a radius of up to approx. 15 mm and a particularly low thickness of approx. 5 mm.

To achieve an attractive appearance of the light signatures in daylight when the lighting device is switched off, the light signatures to be illuminated or backlit are often chrome-plated or mirrored to achieve a metallic appearance. Such a mirror coating is designed to be partially transparent in order to realize the illumination or backlighting of the light signature. However, the transmission is relatively low if an attractive chrome appearance is to be achieved. With common light signatures, the transmission of the mirror coating is in a range between 1% and 20%. In this case, a particularly efficient lighting device is required to achieve the necessary or desired brightness of the illuminated or backlit light signature, which still provides sufficient brightness of the illuminated or backlit light signature despite the low transmission.

Various embodiments of a lighting device 2 according to the invention are shown in FIGS. 1-3 and 10-18. The invention enables a particularly thin structure of the lighting device 2, which does not require back reflection. The lighting device 2 can be manufactured at a particularly low cost and provides a particularly high efficiency and good homogenization of the emitted light 4.

The lighting device 2 comprises at least one semiconductor light source 6 for emitting light in a main radiation direction 8, which corresponds to an optical axis 10 of the semiconductor light source 6. The semiconductor light source 6 may include an LED, such as a top emitting LED.

The at least one semiconductor light source 6 can be mounted and electrically contacted on a printed circuit board 24, preferably on a flexible printed circuit board. The flexible printed circuit board 24 can be designed as a foil. The semiconductor light source 6 can be glued or otherwise attached to a foil 24 printed with conductor tracks 25. The electrical contacting, i.e., the electrical connection of the conductor tracks 25 with corresponding contacts of the semiconductor light source 6, can be carried out using a surface mount, bonding wires or by other means generally known in the art.

Furthermore, the device 2 comprises at least one partially transparent reflective layer 12 arranged in front of and at a distance from at least one associated semiconductor light source 6 in the main radiation direction 8.

Preferably, the at least one partially transparent reflective layer 12 is applied to a transparent plate, which may take the form of a flexible plate or film 14. To realize the partially transparent reflective layer 12, the transparent plate or film 14 can be printed with a partially transparent lacquer. The lacquer applied over the entire surface could be designed in such a way that it reflects part 16 of the incident light and transmits another part 18. In one embodiment, the transmission and reflection properties are independent of the frequency of the light. However, it would also be conceivable to create a partially transparent reflective layer 12 by using a reflective coating that does not allow any light to pass through when applied to the entire surface. Such a coating could be applied to the transparent plate or film 14 in the form of pixels, with a first part 16 of the incident light being reflected in the area of the pixels and a second part 18 of the light being transmitted in the area between adjacent pixels. Of course, any at least partially light-reflecting paint, mirror coating or other reflective coating can be used to form the partially transparent reflective layer 12.

According to a possible further variant, it is also conceivable to create the partial transparency by matting the plate or film 14. Alternatively, in a simplified design, the plate or film 14 could be dispensed with altogether and the matting could, for example, be introduced in one half of the mold, which is then formed directly by the volume scattering material 20. The partially transparent reflective layer 12 is then formed, so to speak, on a surface of the volumetric diffusing material 20.

Figure 17:
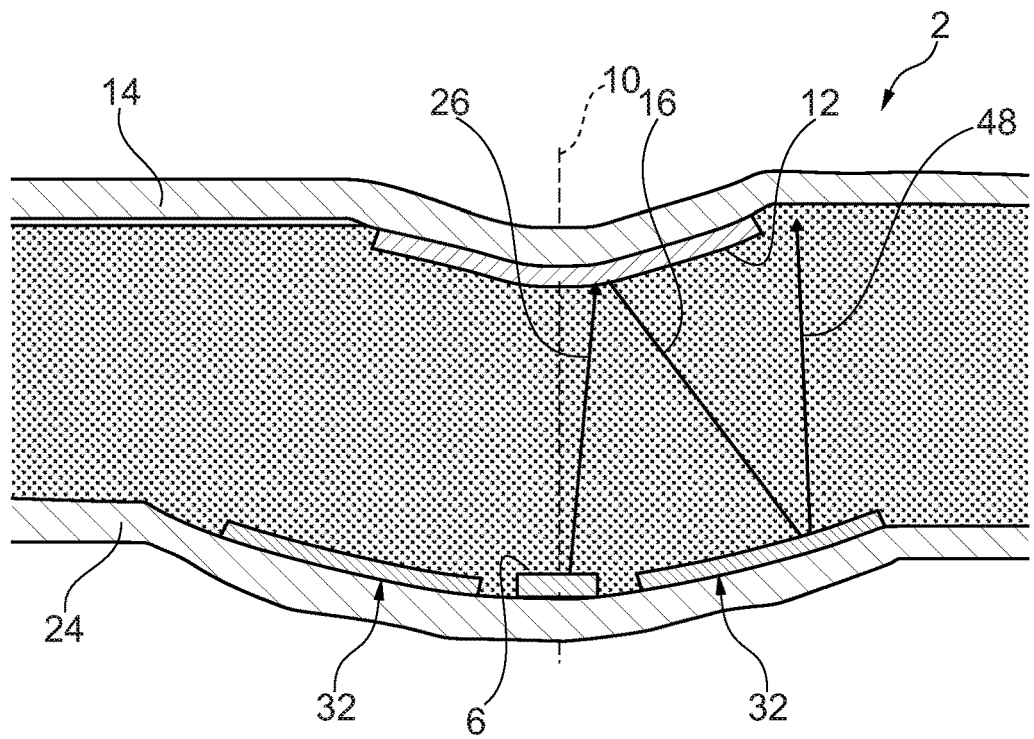
FIG. 17 shows the lighting device of FIG. 16 with exemplary light beams.
Figure 18:
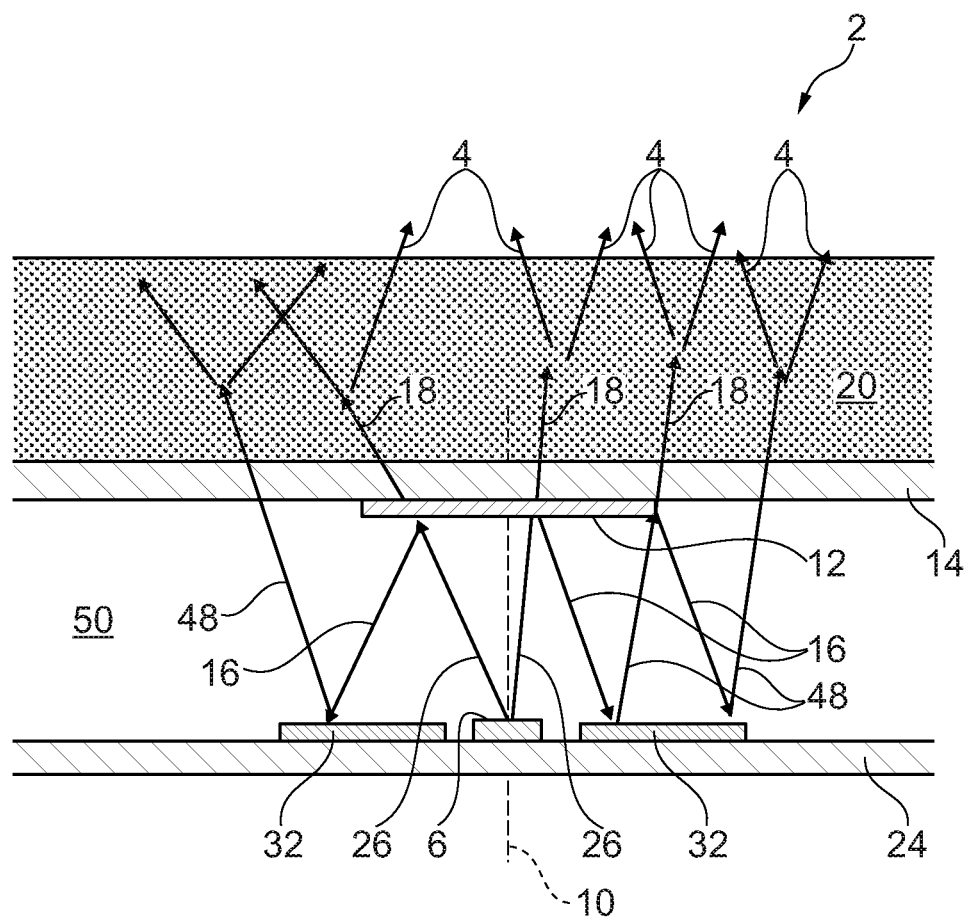
FIG. 18 shows a lighting device according to the invention according to a seventh preferred embodiment with light beams shown by way of example.

Furthermore, the lighting device 2 includes a translucent volume scattering material 20, which is arranged in the space or interspace between the at least one semiconductor light source 6 and the at least one associated partially transparent reflective layer 12 (cf. FIGS. 1-3 and 10-17), or which is arranged in front of the partially transparent reflective layer 12 in the main radiation direction 8 (cf. FIG. 18).

The volume scattering material 20 consists, for example, of a thermoplastic, in particular of a polycarbonate, preferably of a suitable type of Makrolon®. The volume scattering material 20 can be colorless (crystal clear) or colored. The term translucent in connection with the volumetric diffusing material 20 includes both transparent and translucent.

It is conceivable that the volume scattering material 20 is introduced as a separate translucent plate in the space between the semiconductor light source 6 and the associated partially transparent reflective layer 12. An air gap can remain between the volume scattering material 20 and the semiconductor light source 6 and/or between the volume scattering material 20 and the partially transparent reflective layer 12. In one embodiment, however, as shown in the figures, there is no air gap between the volume scattering material 20 and the semiconductor light source 6 and/or between the volume scattering material 20 and the partially transparent reflective layer 12.

In this sense, it is proposed that the translucent volume scattering material 20 is introduced into the gap between the at least one semiconductor light source 6 and the at least one associated partially transparent reflective layer 12 and completely fills this gap. For example, the heated volume scattering material or its starting product can be injected into the gap, where it then hardens. The hardened material forms the volumetric scattering material 20.

It would also be conceivable to first overmold or inject the at least one semiconductor light source 6 with the heated volume scattering material 20 or its starting product, with the main radiation direction 8 of the semiconductor light source 6 running parallel to the optical axis 10 of the semiconductor light source 6 and parallel to a light exit direction 22 of the lighting device 2 for this semiconductor light source 6. In the case of several semiconductor light sources 6 arranged distributed along a curved volume scattering material 20, the lighting device 2 can have several diverging or converging light emission directions. In this case, a separate light exit direction 22 of the lighting device 2 is preferably provided for each of the semiconductor light sources 6. Alternatively, a light exit aperture 22 can also be illuminated by several semiconductor light sources 6, which increases the brightness and/or the homogeneity.

The at least one partially transparent reflective layer 12 can have locally different reflection and transmission properties. This can be achieved, for example, by locally applying a coating, mirror coating or other materials with different reflection/transmission properties. This can lead to a partially transparent reflective layer 12 divided into several sub-areas with different reflection/transmission properties. The transitions of the reflection/transmission properties can be graduated or (almost) stepless. In one embodiment, the transmission of the sub-areas increases radially from the center or the optical axis 10 towards the edge of the reflective layer 12. Various sub-areas with different reflection/transmission properties are designated in FIG. 11 by the reference signs 12.1, 12.2. For example, the sub-region 12.1 in the center could have a transmission of about 20% and an edge region 12.2 a transmission of about 30%-50% depending on how large the sub-region 12.2 is selected.

Alternatively or additionally, a partially transparent reflective layer 12 with locally different reflection and transmission properties can also be realized by a pixel-like application of a coating, mirror coating or other opaque material in conjunction with a different pixel density per unit area and/or different sizes of the pixels. Accordingly, for example, a smooth transition of the transmittance as a function of a radial distance to the optical axis 10 with a fill factor of the coating, mirror coating or other opaque material is shown. Instead of a full-surface coating in the area of the partially transparent reflective layer 12, more and more pixels cannot be printed or can be printed smaller in the radial progression, resulting in a "holey" reflective layer 12 with a non-covering fill factor. Due to the non-covering fill factor, the transmittance can be increased according to the fill factor.

The partially transparent reflective layer 12 is designed in such a way that at least no clearly perceptible difference in brightness is recognizable in the light 4 emitted by the lighting device 2 or in the illuminated or backlit light signature 36.

Of course, the different transmission or reflection properties can be distributed as desired to different areas of the partially transparent reflective layer 12. This has the advantage that hotspots or intensity maxima in the light emitted by the lighting device 2 can be specifically reduced or even eliminated.

In one embodiment, it is preferable if the transmission of the partially transparent reflective layer 12 increases outwards from a minimum value in the area of the optical axis 10 or around the main direction of radiation 8 of a semiconductor light source 6 assigned to the partially transparent reflective layer 12. This means that the central light rays emitted by the semiconductor light source 6 around the optical axis 10 are reflected most strongly and the greater the angle of the emitted light rays to the optical axis 10, the greater the proportion 18 of transmitted light. This takes account of the fact that, in the prior art, hotspots occur in particular around the optical axis 10 of the semiconductor light source 6, i.e., in the main radiation direction 8 of the semiconductor light source 6. These hotspots can be specifically reduced or even prevented with this further development and the emitted light can be homogenized particularly well.

One aspect of the invention is to inject or overmold the semiconductor light source 6 with the volume scattering material 20, with the radiation direction 8 of the semiconductor light source 6 running along the optical axis 10.

The semiconductor light source 6 can be glued onto a foil 24 printed with conductor tracks 25 or attached and contacted in some other way. The semiconductor light source 6 is then overmolded with the volume scattering material 20, with the volume scattering material 20 being injected between a second foil 14. The second film 14 is printed with a partially transparent coating or provided with a partially transparent mirror coating in order to form the partially transparent reflective layer 12 and to reduce the hotspot around the optical axis 10 that occurs due to the low overall height.

It is conceivable that several semiconductor light sources 6 are mounted and contacted on the foil 24 distributed over and/or next to each other and/or offset to each other. The foil 24 can have a flat or curved surface extension. In particular, the shape of the foil 24 in three-dimensional space follows the shape of a front panel or other motor vehicle component in which the light signatures 36 to be illuminated are present. In one embodiment, each light signature 36 is assigned its own semiconductor light source 6.

Figure 2:
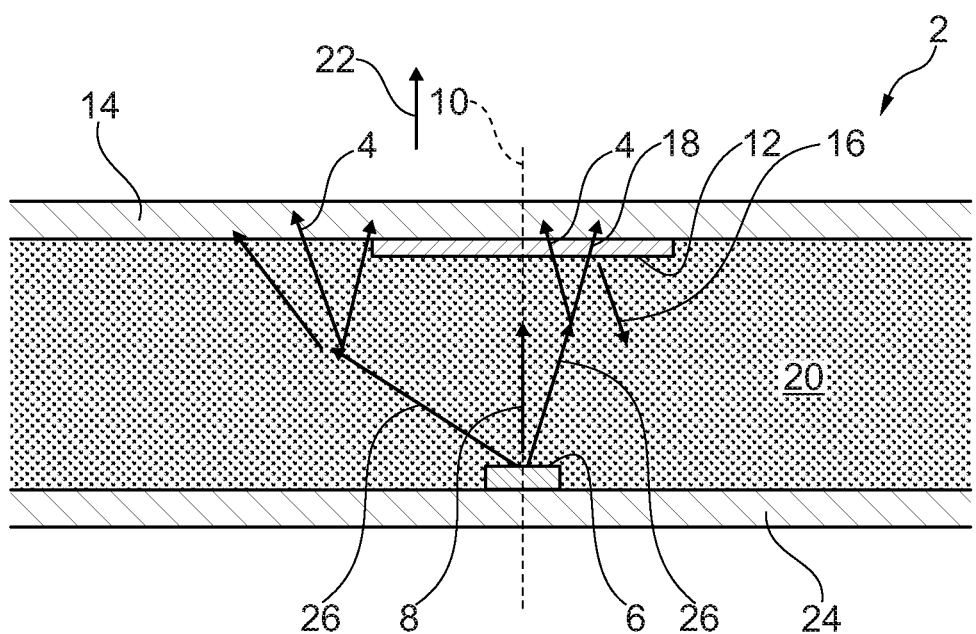

FIG. 2 shows an example of a schematic beam path. The light 26 emitted by the semiconductor light source 6 is scattered as it passes through the volume scattering material 20 on its way to the second foil 14 and then emerges from the foil 14 over a large area in the light exit direction 22 or at an angle thereto. In the region of the partially transparent reflective layer 12, a portion 18 of the light is transmitted and another portion 16 of the light is reflected. The transmission of the partially transparent reflective layer 12 is selected in such a way that an intensity maximum or hotspot in the center, i.e., in the area of the optical axis 10, is attenuated.

Figure 3:
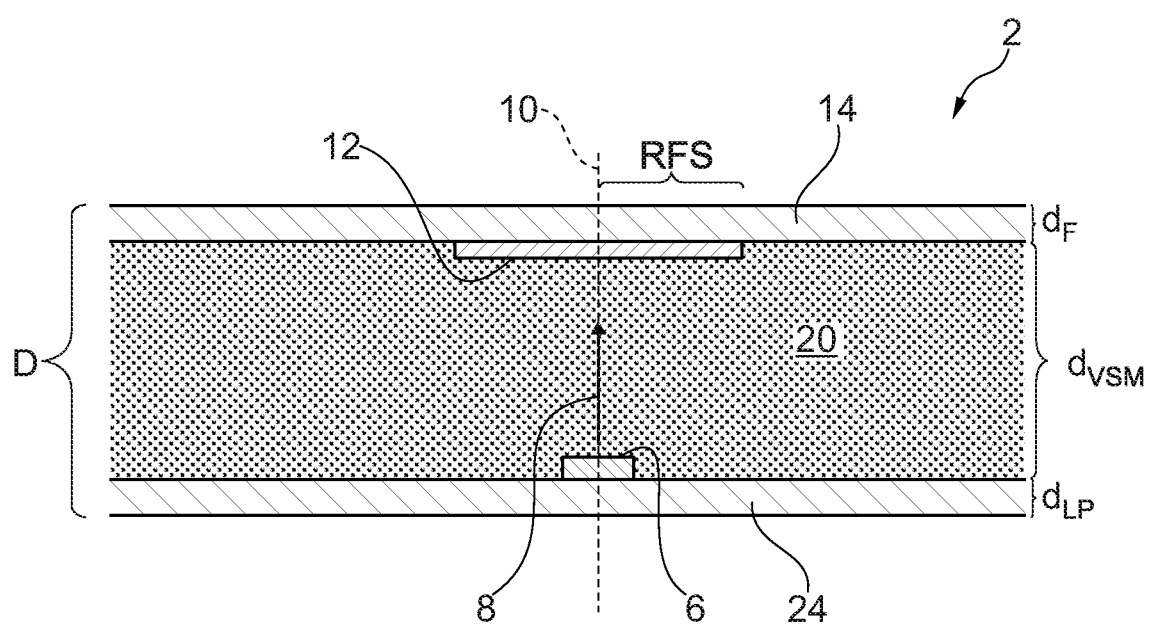
FIG. 3 shows the lighting device from FIG. 1 with dimensions shown by way of example.

FIG. 3 shows exemplary dimensions of the lighting device 2, which in this example only has a semiconductor light source 6. The flexible printed circuit board 24, on which the semiconductor light source 6 is mounted and contacted, has a thickness dup in the range from 0.1 mm to 1.0 mm, in particular of about 0.4 mm. The same applies to the thickness de of the foil 14 to which the partially transparent reflective layer 12 is applied. The space between the two foils 14, 24 and thus also the thickness $d_{VSM}$ of the volume scattering material 20 introduced therein is, for example, in the range from 3 mm to 6 mm, in particular around 4 mm. In total, the lighting device 2 therefore has a thickness of approximately 4.8 mm. The partially transparent reflective layer 12 extends around the optical axis 10, namely further than the associated semiconductor light source 6. In one embodiment, it is proposed that the reflective layer 12 extends away from the optical axis 10 by approximately RFS=2 mm to 4 mm, in particular by approximately 3 mm, in various directions. The total thickness D of the lighting device 2 is preferably less than 10 mm, more preferably less than 8 mm, most preferably less than 6 mm, in particular about 5 mm.

In a plan view in the main radiation direction 8 parallel to the optical axis 10, the partially transparent reflective layer 12 can have a round, oval, rectangular, square or other polygonal contour. The contour is delimited by an area of the reflective layer 12 in which at least 10%, or at least 20%, or at least 50% of the incident light is reflected. In contrast, in the areas of the film 14 beyond the reflective layer 12, almost no light is reflected, or at least significantly less.

While the partially transparent reflective layer 12 in FIGS. 1-3 is arranged on the back or inside of the film 14, FIGS. 4, 7 and 10-12 show other examples where the partially transparent reflective layer 12 is arranged on the front or outer side of the film 14, i.e., on the side facing the light signature 36.

The light signature 36 can be formed in any desired manner so that it can be illuminated or backlit by the lighting device 2. Examples of the structure of a light signature 36 are known from U.S. Pat. No. 7,712,933 B2, to which express reference is made. In a first type, the light signature 36 comprises an opaque material and is embedded in a likewise opaque plate or film, wherein a gap remains between the light signature 36 and the plate or film, which can be illuminated by the lighting device 2. In a second type, the light signature 36 is formed by one or more recesses in an opaque plate or film, which can be illuminated by the lighting device 2. A translucent material can be arranged in or on the recesses, which preferably also has the shape of the light signature 36. The translucent material prevents foreign bodies from entering the recesses and/or can scatter the light passing through and/or can have a partially transparent chrome coating 44, so that the light signature 36 has a chrome effect when the lighting device 2 is switched off. In a third type, the light signature 36 is formed by a translucent material that has the shape of the light signature 36 and is embedded in a transparent plate or film. The translucent material can scatter the light passing through it and/or have a partially transparent chrome coating 44, so that the light signature 36 has a chrome effect when the lighting device 2 is switched off.

Figure 4:
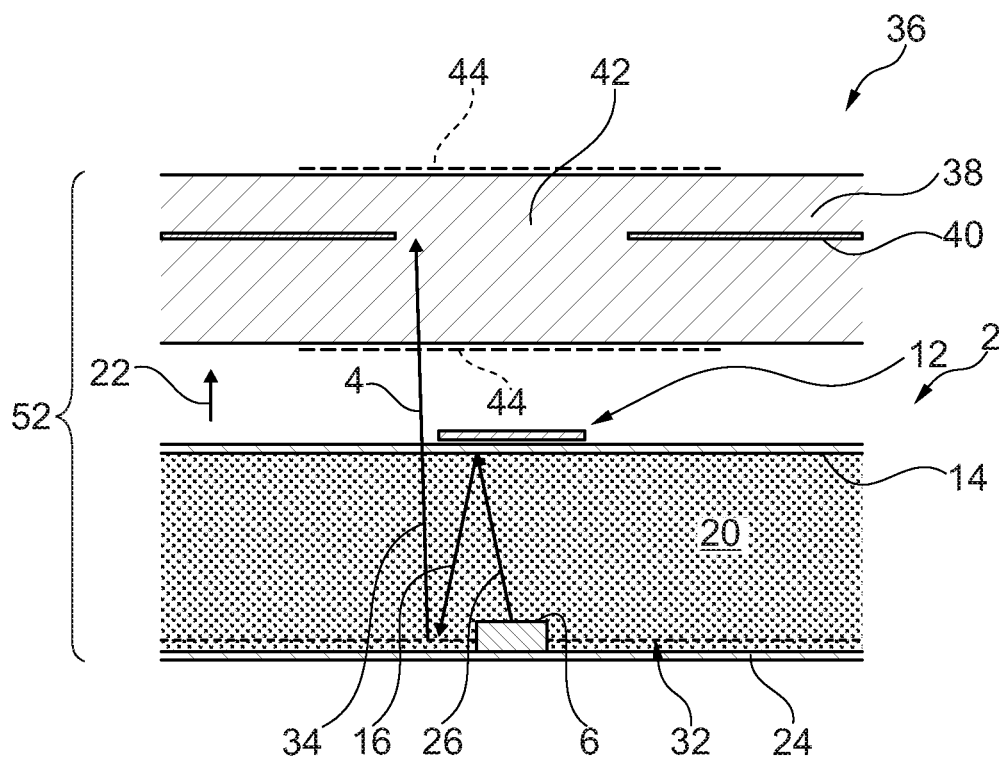
FIG. 4 shows a lighting unit according to the invention in a first preferred embodiment.
Figure 7:
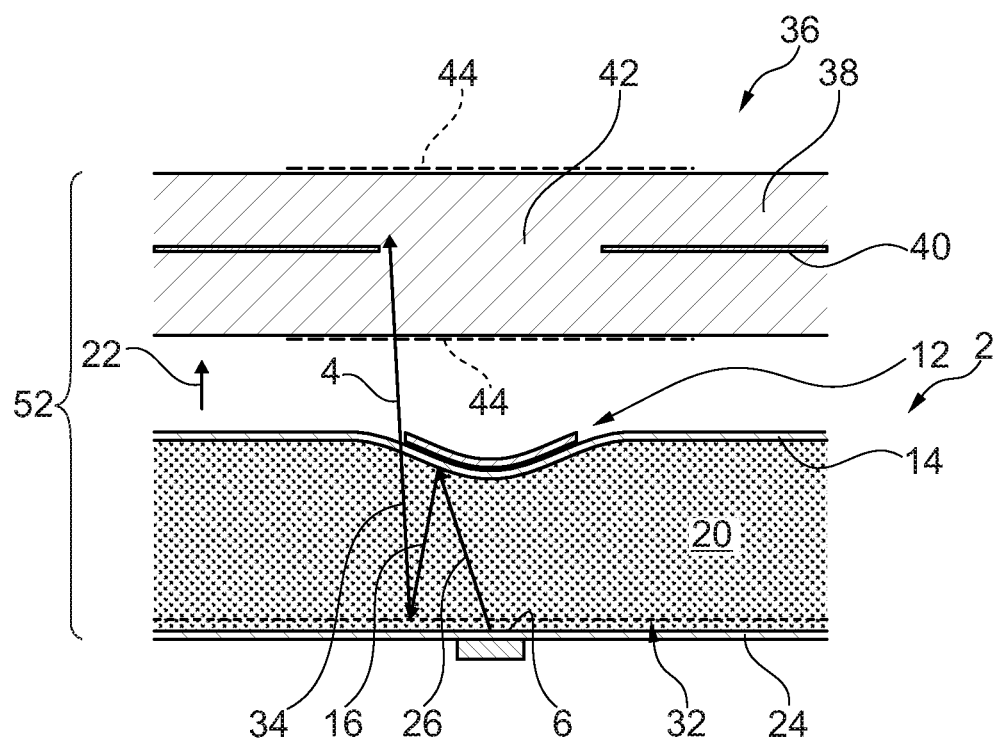
FIG. 7 shows a lighting unit according to the invention in a second preferred embodiment.

In the examples of FIGS. 4 and 7, the light signature 36 comprises a transparent plate or film 38 in which an opaque coating 40 is embedded. The coating 40 comprises one or more recesses 42 which correspond to the shape of the light signature 36. The light 4 from the lighting device 2 can pass through the recesses 42 so that the illuminated area corresponds to the light signature 36. It would be conceivable that a partially transparent chrome coating 44 is applied to the inside (or rear side) or the outside (or front side) of the plate or foil 38.

FIGS. 4 and 7 show examples of lighting units 52 according to the invention, each comprising at least one lighting device 2 according to the invention and at least one light signature 36 to be illuminated or backlit.

Figures 5, 6:
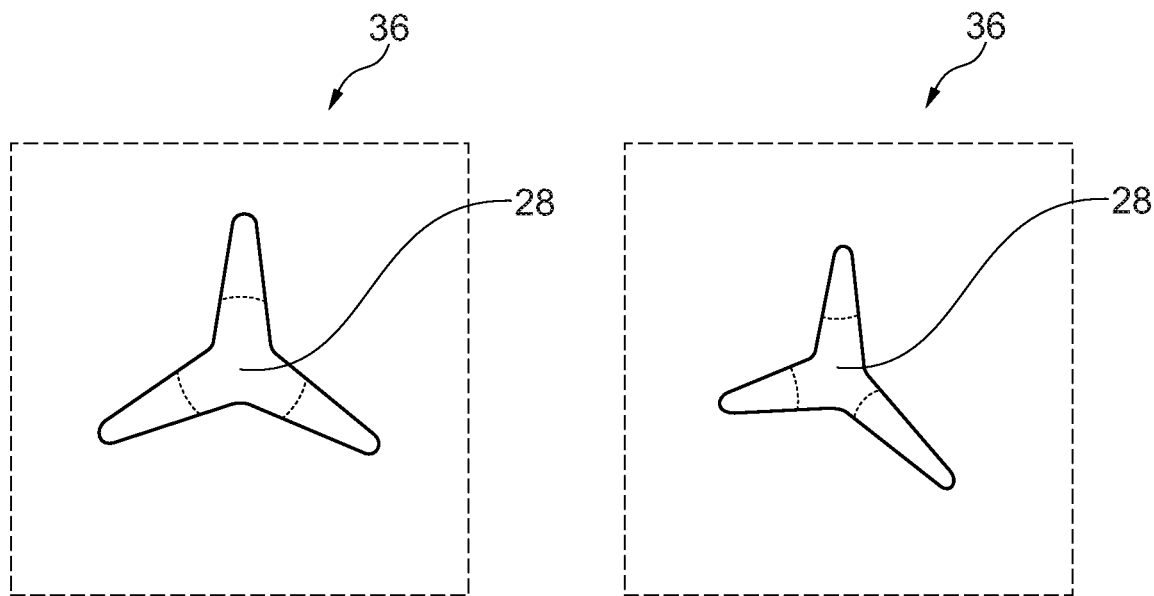
FIG. 5 shows a light segment of the lighting unit from FIG. 4 to be illuminated or backlit in a plan view 0° horizontal, 0° vertical.
FIG. 6 shows the light segment of FIG. 5 in an oblique view 30° horizontal, 30° vertical.
Figures 8, 9:
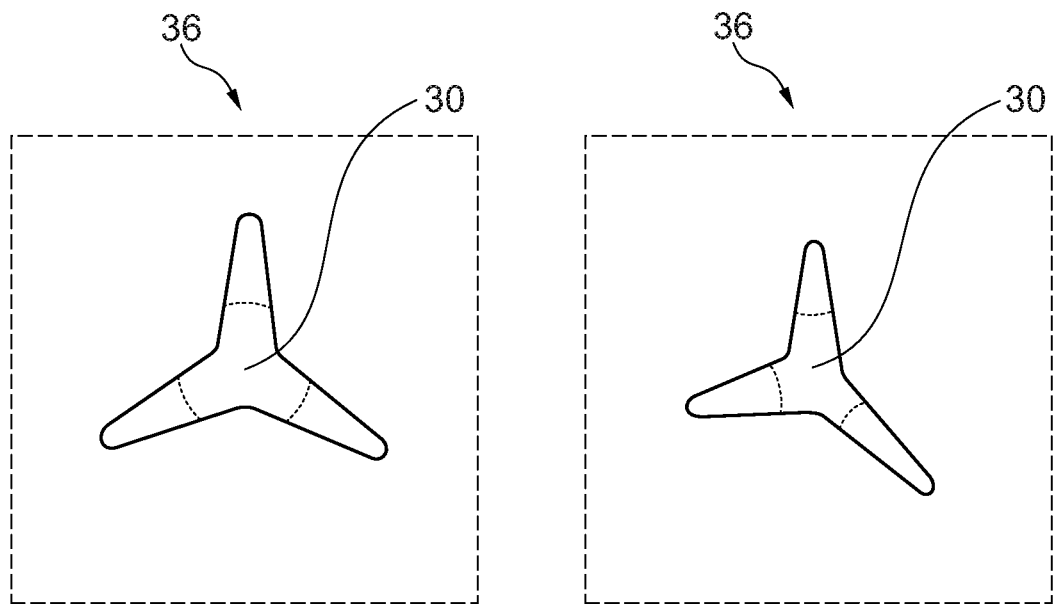
FIG. 8 shows a light segment of the lighting unit from FIG. 7 to be illuminated or backlit in a plan view 0° horizontal, 0° vertical.
FIG. 9 shows the light segment of FIG. 8 in an oblique view 30° horizontal, 30° vertical.
Figure 10:
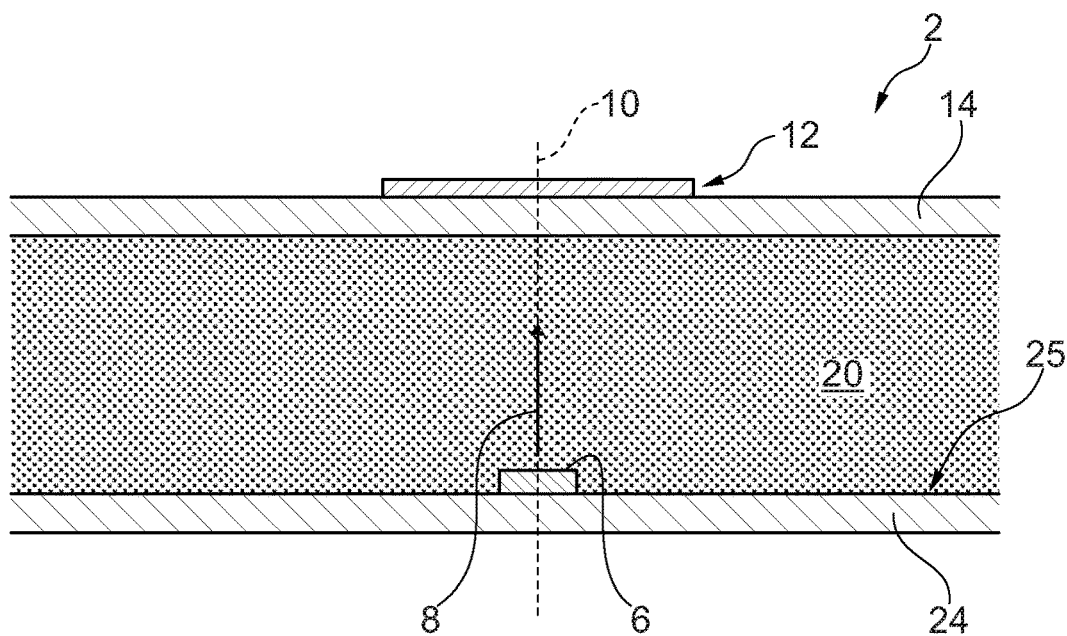
FIG. 10 shows a lighting device according to the invention according to a second preferred embodiment.
Figure 11:
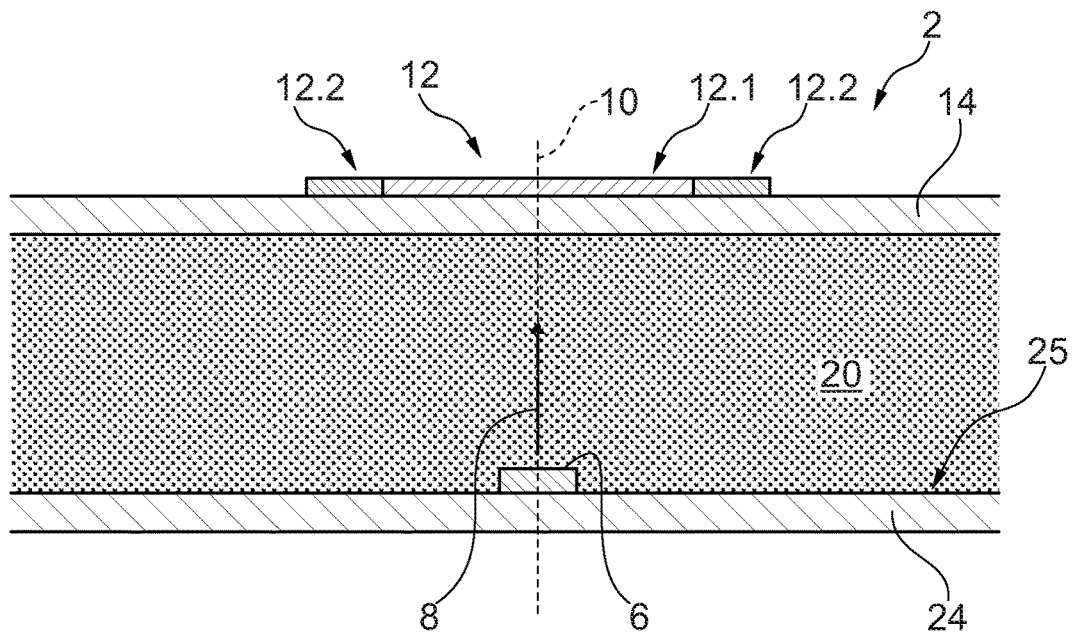
FIG. 11 shows a lighting device according to the invention according to a third preferred embodiment.
Figure 12:
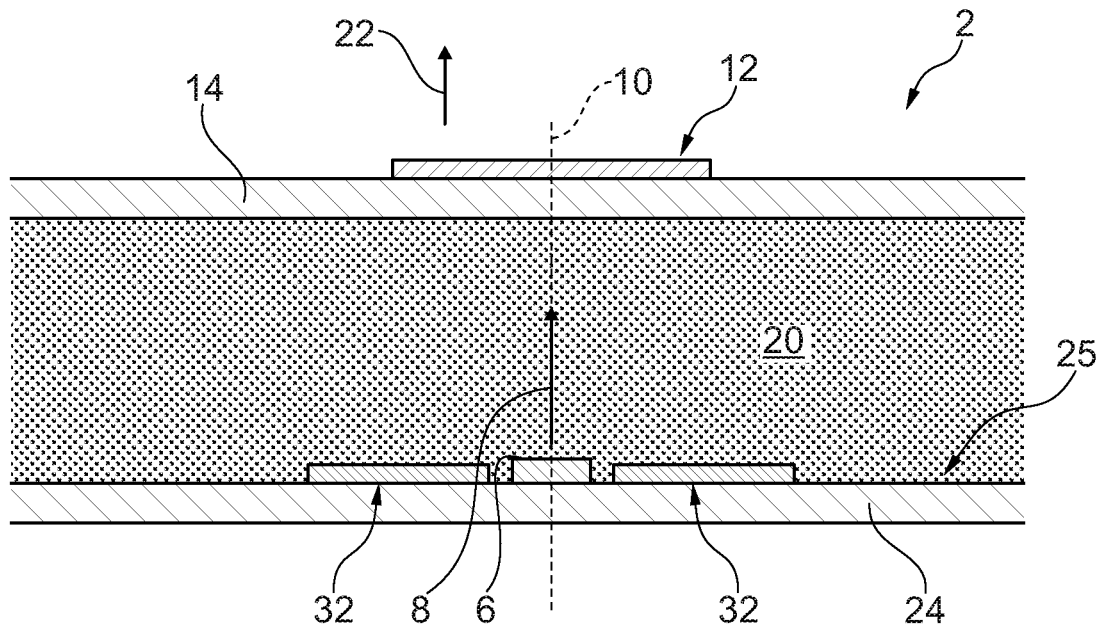
FIG. 12 shows a lighting device according to the invention according to a fourth preferred embodiment.
Figure 13:
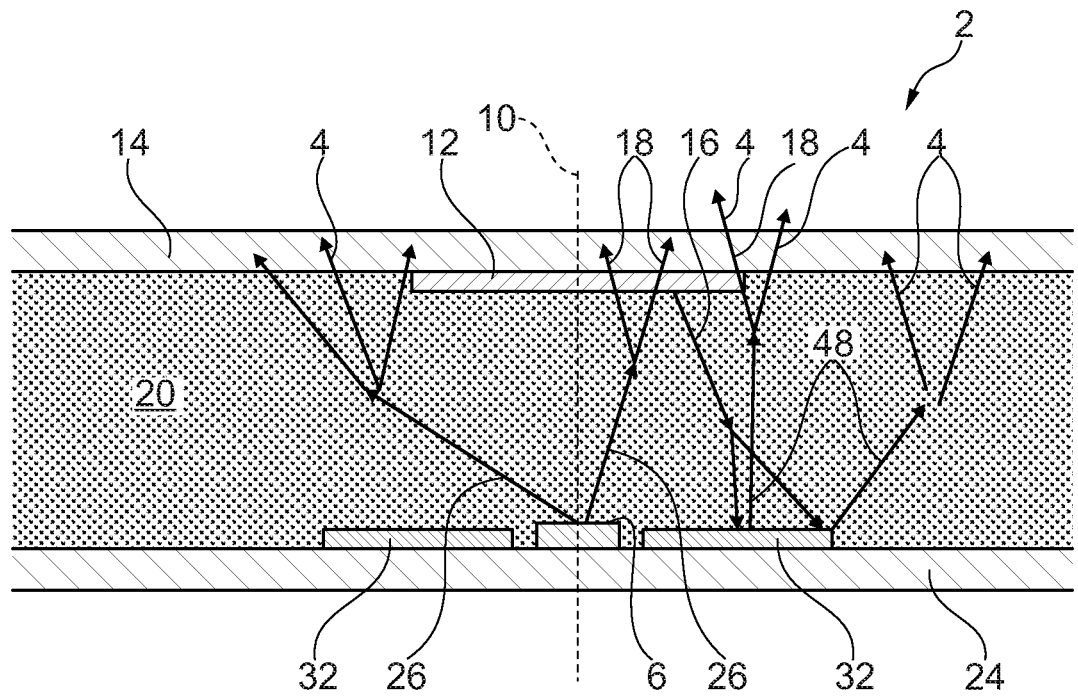
Figure 14:
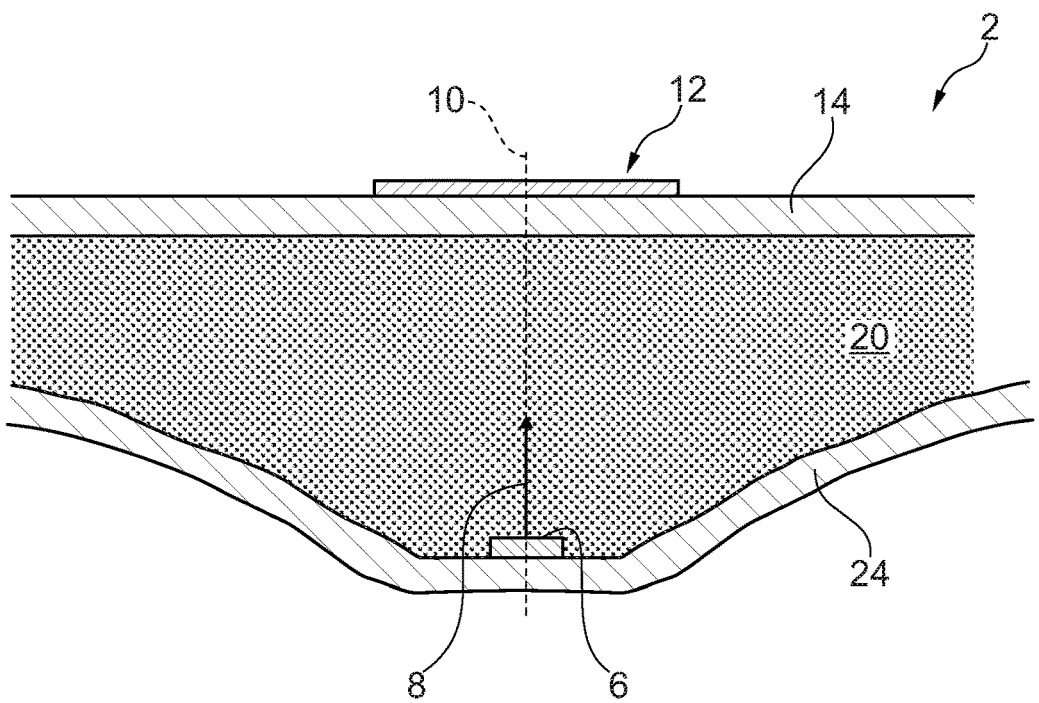
FIG. 14 shows a lighting device according to the invention according to a fifth preferred embodiment.
Figure 15:
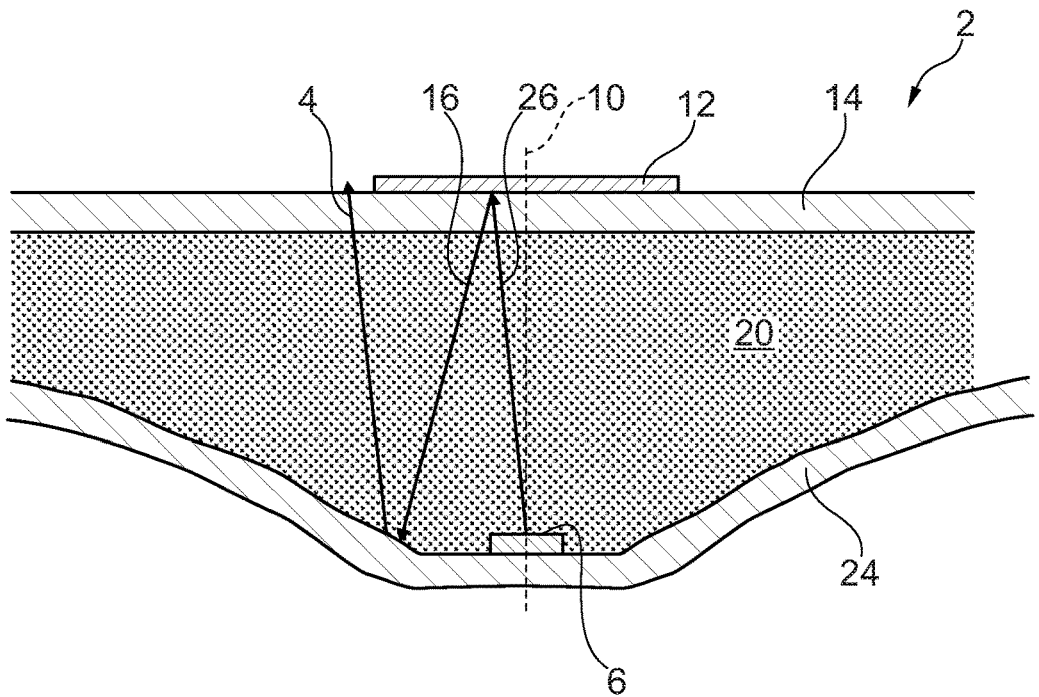
FIG. 15 shows the lighting device of FIG. 14 with exemplary light beams.
Figure 16:
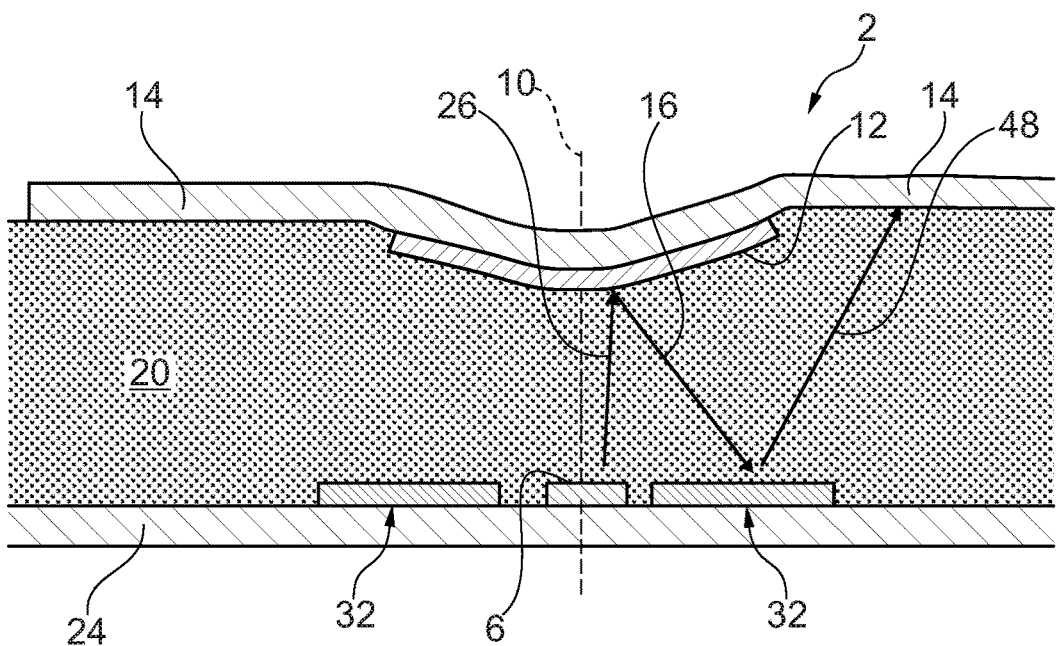
FIG. 16 shows a lighting device according to the invention according to a sixth preferred embodiment.

In the example of a light signature 36 in the form of an illuminated or backlit three-pointed star, the light distribution or the backlit light signature 36 looks as shown in FIGS. 5 and 6 or 8 and 9. In FIGS. 4-6, the partially transparent reflective layer 12 has a transmission of about 10%, whereas the transmission in FIGS. 7-9 is around 20%. It can be clearly seen that in FIGS. 5 and 6, there is a dark area 28 in the center of the light signature 36 around the optical axis 10. This applies both to the vertical plan view (FIG. 5) and to the oblique plan view at an angle of 30° (FIG. 6). The reason for this is that too much of the light 26 is reflected by the partially transparent reflective layer 12.

In contrast, a brighter area 30 can be seen in the center of the light signature 36 around the optical axis 10 in FIGS. 8 and 9. This applies both to the vertical plan view (FIG. 5) and to the oblique plan view at an angle of 30° (FIG. 6). The reason for this is that a smaller proportion of the light 26 is reflected by the partially transparent reflective layer 12 than in the example in FIGS. 4-6. With a transmission of 20%, the transition area between the partially transparent reflective layer 12 and the outer adjacent areas of the film 14 is better blurred in this example.

Further differences between the examples of FIGS. 4-9 compared to the example of FIGS. 1-3 consist, for example, in a second reflective layer 32, which is arranged around the at least one semiconductor light source 6 (dotted line above the printed circuit board 24). This improves the efficiency of the lighting device 2, since the part 16 of the light reflected by the partially transparent reflective layer 12 strikes the second reflective layer 32 and is reflected by it again as light 34 in the light emission direction 22. The light 34 can be transmitted through the partially transparent reflective layer 12, reflected from it again or leave the lighting device 2 through the film 14 next to the reflective layer 12. This has the advantage that not only the high light intensities in the center, i.e., around the optical axis 10, are reduced, but at the same time the low light intensities at a distance from the optical axis 10 are amplified. The determining factor for determining the transmittance is the radial distance (start and end) of the sub-regions 12.1, 12.2 from the optical axis 10.

In the example in FIGS. 12-13 and 16-18, a second reflection layer 32 is arranged around the at least one semiconductor light source 6, which reflects the light 16 back towards the foil 14 (cf. light 48 in FIG. 13) and thus increases the homogeneity of the emitted light 4 and the efficiency of the lighting device 2. In one embodiment, the second reflective layer 32 is applied to the flexible printed circuit board or foil 24. The second reflective layer 32 is provided with the highest possible degree of reflection and can be scattering or specularly reflective. The second reflective layer 32 comprises, for example, a matt white print.

In order to further increase the efficiency of the lighting device 2, a second reflective layer 32 may, for example, comprise a matt white print. 14-17, the foil 14 and conductor track 24 can also be designed with a wave-like geometry in cross-section to minimize lateral migration of the light. In one embodiment, the printed circuit board 24 is curved in the area of the at least one semiconductor light source 6 in a direction away from the at least one associated partially transparent reflective layer 12. This is particularly advantageous in connection with a second reflective layer 32 on the printed circuit board 24.

A corresponding configuration of the light-transmitting film 14 in the center in the region of the optical axis 10 opposite the semiconductor light source 6 is advantageous in order to deflect the light of the hotspot or hotspots away from the center. In this context, it is proposed that the partially transparent reflective layer 12 in the region of the optical axis 10 is curved in a direction towards the at least one associated semiconductor light source 6. The light directed outwards in this way is available for illuminating the edge areas at a greater distance from the optical axis 10. This is particularly advantageous with a second reflective layer 32 with a scattering effect. Instead of the spherical reflector shown in FIGS. 16 and 17, the film 14 or the partially transparent reflective layer 12 can also be designed as a pointed pyramid with any polygonal base.

FIG. 17 shows an example in which both the printed circuit board 24 and the foil 14 or the partially transparent coating 12 applied thereto are curved in the region of the optical axis 10 in a direction along the optical axis 10. This has the advantage that the light 16, after lateral deflection by reflection at the convexly curved partially transparent reflective layer 12, passes through the transparent film 14 as light 48 laterally next to the partially transparent reflective layer 12 by further reflection at the concavely curved second reflective layer 32 and leaves the lighting device 2.

In order to minimize crosstalk to adjacent semiconductor light sources 6, an absorbent coating, for example a black lacquer, can be applied to the printed circuit board 24 and/or the foil 14 in intermediate regions between adjacent semiconductor light sources 6 in a manner analogous to the second reflective layer 32. A further possibility to reduce the crosstalk would be to apply a separation, e.g., by using so-called laser deep printing, directly into the material. By reducing the crosstalk, light signatures 36 of a plurality of light signatures 36 arranged next to, above or offset to one another can be illuminated or darkened individually or in groups, whereby the difference (contrast) between illuminated light signature 36 and darkened or non-illuminated light signature 36 is particularly clearly visible.

In the example of FIG. 18, a clear transparent polycarbonate 50 is arranged at the distance between the partially transparent reflective layer 12 and the at least one semiconductor light source 6 instead of the volume scattering material 20. In one embodiment, the clear polycarbonate 50 fills the entire space between the partially transparent reflective layer 12 and the semiconductor light source 6. In this case, it is preferable to design the film 14 as a diffusing film and, if necessary, to make it thicker than in the preceding embodiments. Alternatively, a scattering coating, for example a scattering varnish or a roughened surface, can be applied or formed over the entire surface of the outside (or front) of the scattering foil 14.

In addition, a volume scattering layer 20 can be arranged on the outside of the film 14, for example by spraying. This would be preferable, as it allows a greater layer thickness to be built up. This achieves better homogeneity of the emitted light 4 than if only the film 14 were a scatter film or a scatter coating or a roughened surface were applied to the film 14.

The emitted light 4 is all the more homogeneously distributed the greater the distance between the partially transparent reflective layer 12 and the scattering layer downstream in the beam path, i.e., the greater the thickness of the foil 14 and/or the thickness of the volume scattering material 20 on the outside.

The printed circuit board or foil 24 and/or the foil 14 can be formed into the desired shape by thermoforming. The foils 14, 24 can be placed in an injection mold and the volume between the foils 14, 24 can be injected with the clear transparent material 50 or with the volume scattering material 20.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A lighting device for illuminating or backlighting a light signature, said lighting device comprising:
   at least one semiconductor light source for emitting light in a main radiation direction corresponding to an optical axis of the semiconductor light source,
   at least one partially transparent reflective layer arranged in front of and at a distance from at least one associated semiconductor light source in the main emission direction, and a translucent volume scattering material which is arranged in a space defined by the distance between the at least one semiconductor light source and the at least one associated partially transparent reflective layer, wherein the at least one partially transparent reflective layer has locally different reflection and transmission properties, and wherein the transmission of a partially transparent reflective layer increases with increasing distance from the optical axis, starting from a minimum value in the region of the optical axis of a semiconductor light source assigned to the partially transparent reflective layer.

2. The lighting device as set forth in claim 1, wherein the at least one associated partially transparent reflective layer completely fills the space between the at least one semiconductor light source.

3. The lighting device as set forth in claim 2, wherein the at least one semiconductor light source is mounted on a printed circuit board, preferably on a flexible printed circuit board, and is electrically contacted.

4. The lighting device as set forth in claim 2, wherein the at least one partially transparent reflective layer is applied to a transparent flexible plate or foil.

5. The lighting device as set forth in claim 1, wherein the at least one semiconductor light source is mounted on a printed circuit board, preferably on a flexible printed circuit board, and is electrically contacted.

6. The lighting device as set forth in claim 5, wherein the transparent plate with the at least one associated partially transparent reflective layer completely fills the space between the at least one semiconductor light source.

7. The lighting device as set forth in claim 5, wherein the at least one partially transparent reflective layer is applied to a transparent flexible plate or foil.

8. The lighting device as set forth in claim 7, wherein the transparent plate with the at least one associated partially transparent reflective layer completely fills the space between the at least one semiconductor light source.

9. The lighting device as set forth in claim 1, wherein the at least one partially transparent reflective layer is applied to a transparent flexible plate or foil.

10. The lighting device as set forth in claim 1, wherein the at least one partially transparent reflective layer is a lacquering or coating.

11. The lighting device as set forth in claim 1, wherein the at least one partially transparent reflective layer is designed to scatter the transmitted light and/or the reflected light.

12. The lighting device as set forth in claim 1, wherein a second reflection layer is arranged around the at least one semiconductor light source.

13. The lighting device as set forth in claim 1, wherein the at least one semiconductor light source is mounted on a printed circuit board, on a flexible printed circuit board, and is electrically contacted; and the printed circuit board is curved in the region of the at least one semiconductor light source in a direction away from the at least one associated partially transparent reflective layer.

14. The lighting device as set forth in claim 1, wherein the at least one partially transparent reflective layer in the region of the optical axis of the at least one associated semiconductor light source is curved in a direction towards the at least one associated semiconductor light source.

15. A lighting unit comprising at least one light signature which can be illuminated or backlit and a lighting device for emitting light for illuminating or backlighting the light signature which can be illuminated or backlit, wherein the lighting device is designed as set forth in claim 1.

16. The lighting unit as set forth in claim 15, wherein the at least one light signature which can be illuminated or backlit is a logo, an emblem or a name of a motor vehicle manufacturer or a vehicle model.

17. The light unit as set forth in claim 15, wherein the at least one light signature that can be illuminated or backlit is part of a front panel or a front grille of a motor vehicle.

18. A lighting device for illuminating or backlighting a light signature, said lighting device comprising:

at least one semiconductor light source for emitting light in a main radiation direction corresponding to an optical axis of the semiconductor light source, at least one partially transparent reflective layer arranged in front of and at a distance from at least one associated semiconductor light source in the main emission direction, and a translucent volume scattering material which is arranged in front of the partially transparent reflective layer in the main direction of radiation, wherein the at least one partially transparent reflective layer has locally different reflection and transmission properties, and wherein the transmission of a partially transparent reflective layer increases with increasing distance from the optical axis, starting from a minimum value in the region of the optical axis of a semiconductor light source assigned to the partially transparent reflective layer.

19. The lighting device as set forth in claim 18, wherein a clear transparent polycarbonate is arranged in the distance between the at least one semiconductor light source and the at least one associated partially transparent reflective layer.

20. A lighting unit comprising at least one light signature which can be illuminated or backlit and a lighting device for emitting light for illuminating or backlighting the light signature which can be illuminated or backlit, wherein the lighting device is designed as set forth in claim 18.

21. The lighting unit as set forth in claim 20, wherein the at least one light signature which can be illuminated or backlit is a logo, an emblem or a name of a motor vehicle manufacturer or a vehicle model.

22. The lighting unit as set forth in claim 20, wherein the at least one light signature that can be illuminated or backlit is part of a front panel or a front grille of a motor vehicle.

23. The lighting device as set forth in claim 18, wherein the at least one semiconductor light source is mounted on a printed circuit board, on a flexible printed circuit board, and is electrically contacted.

* * * * *